United States Patent
Zhou

(10) Patent No.: US 6,638,594 B1
(45) Date of Patent: Oct. 28, 2003

(54) REWRITABLE OPTICAL INFORMATION RECORDING MEDIUM

(75) Inventor: Guo-Fu Zhou, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 71 days.

(21) Appl. No.: 09/640,111

(22) Filed: Aug. 15, 2000

(30) Foreign Application Priority Data

Aug. 18, 1999 (EP) .............................. 99202676

(51) Int. Cl.$^7$ ................................ B32B 3/02
(52) U.S. Cl. .................. 428/64.4; 428/64.1; 428/64.9
(58) Field of Search ................ 428/64.4, 64.1, 428/64.9

(56) References Cited

U.S. PATENT DOCUMENTS 5,848,043 A    12/1998  Takada et al. .............. 369/116
5,965,229 A  * 10/1999  Zhou et al. ................. 428/64.4
5,974,025 A  * 10/1999  Yamada et al. ............. 369/288
6,159,573 A  * 12/2000  Zhou et al. ................. 428/64.1

* cited by examiner

Primary Examiner—Cynthia H. Kelly
Assistant Examiner—L. Ferguson
(74) Attorney, Agent, or Firm—Ernestine C. Bartlett

(57) ABSTRACT

A description is given of a rewritable optical information medium comprises a substrate (1), a first dielectric layer (2), a phase-change recording layer on the basis of AgaInbSbcTed or GeaInbSbcTed (3), a second dielectric layer (4), and a metal mirror layer (5), wherein $2 < a < 8$
$0 < b < 6$
$55 < c < 80$
$15 < d < 30$; $a+b+c+d=100$, and wherein the layer thickness of said recording layer (3) ranges between 5 and 15 nm. Such a medium is suitable for use in high density and high data rate phase change optical recording systems and media such as DVD+RW, DVR-red and -blue.

4 Claims, 2 Drawing Sheets

REWRITABLE OPTICAL INFORMATION RECORDING MEDIUM

BACKGROUND OF THE INVENTION

The invention relates to an optical information recording medium for rewritable high-speed recording by means of a laser-light beam, said medium comprising a substrate carrying a stack of layers, which stack comprises, in this order, a first dielectric layer, a recording layer comprising a phase-change recording material comprising Sb and Te, a second dielectric layer and a metal mirror layer.

The invention also relates to the use of such an optical recording medium in high storage density and high data rate applications.

Optical information or data storage based on the phase change principle is attractive, because it combines the possibilities of direct overwrite (DOW) and high storage density with easy compatibility with read-only systems. Phase-change optical recording involves the formation of submicrometer-sized amorphous recording marks in a thin crystalline film using a focused laser-light beam. During recording information, the medium is moved with respect to the focused laser-light beam which is modulated in accordance with the information to be recorded. Due to this, quenching takes place in the phase-change recording layer and causes the formation of amorphous information bits in the exposed areas of the recording layer which remains crystalline in the unexposed areas. Erasure of written amorphous marks is realized by recrystallizing through heating with the same laser. The amorphous marks represent the data bits, which can be reproduced via the substrate by a low-power focused laser-light beam. Reflection differences of the amorphous marks with respect to the crystalline recording layer bring about a modulated laser-light beam which is subsequently converted by a detector into a modulated photocurrent in accordance with the coded, recorded digital information.

One of the most important demands in phase-change optical recording is a high data rate. A high data rate requires the recording layer to have a high crystallization rate, i.e. a short crystallization time. To ensure that the previously recorded amorphous marks can be recrystallized during direct overwrite, the recording layer should have a proper crystallization time to match the linear velocity of the medium relative to the laser-light beam. If the crystallization speed is not high enough to match the linear velocity of the medium relative to the laser-light beam, the old data (amorphous marks) from the previous recording cannot be completely erased (recrystallized) during DOW. This will cause a high noise level. High crystallization speed is particularly required in high-density recording and high data rate applications, such as disc-shaped DVD+RW, DVR-red and blue and CD-RW, where the complete erasure time (CET) has to be shorter than approximately 60 ns. For DVD+RW, which has a 4.7 GB recording density per 120 mm disk, a user data bit rate of 33 Mbits/s is needed, and for DVR-red a user data bit rate of 35 Mbits/s is needed. For rewritable phase change optical recording systems such as DVR-blue (digital video recording operated with a blue laser-light beam), a user data bit rate higher than 50 Mbits/s is required.

An optical information medium of the type mentioned in the opening paragraph is known from United States patent U.S. Pat. No. 5,876,822, filed by Applicants. The known medium of the phase-change type comprises a disc-shaped substrate carrying a stack of layers consisting of, in succession, a first dielectric layer, a recording layer of a phase-change Ge—Sb—Te recording material, a second dielectric layer and a metal reflective layer. Such a stack of layers can be referred to as an IPIM structure, wherein M represents a reflective or mirror layer, I represents a dielectric layer and P represents a phase-change recording layer. Said patent discloses that the CET-value can be shortened by optimizing the composition of the recording material. The CET-value of the recording layer comprising such a recording material decreases as the thickness of the recording layer increases. The shortest CET-value is obtained at a thickness between 25 and 35 nm. Experiments have shown that a user data bit rate of 40 Mbits/s can be achieved with such a recording layer when oxygen is added to the recording material and a SiC cap layer is applied to the stack.

SUMMARY OF THE INVENTION

It is an object of the invention to provide, inter alia, a rewritable optical information medium which is suitable for high speed optical recording, such as DVD+RW, DVD-red and DVD-blue, and for DOW. The CET-value of the recording layer should be 60 ns or lower. In particular, the medium should have a user data bit rate of at least 50 Mbits/s. High speed recording is to be understood to mean in this context a linear velocity of the medium relative to the laser-light beam of at least 4.8 m/s, which is four times the speed according to the compact disc standard.

These objects are achieved in accordance with the invention by an optical information medium as described in the opening paragraph, which is characterized in that the recording material consists of a composition defined by the formula $Q_a In_b Sb_c Te_d$ (in atomic percentages), wherein Q is selected from the group consisting of Ag and Ge;
$2<a<8$
$0<b<6$
$55<c<80$
$15<d<30$; $a+b+c+d=100$, and
the recording layer having a thickness of 5 to 15 nm.

In contrast with a recording layer based on Ge—Sb—Te, a recording layer based on Ag—In—Sb—Te or Ge—In—Sb—Te shows a decreasing CET-value as its thickness decreases. The shortest CET-value is found at a thickness smaller than 15 nm, said value being below 60 ns, or even below 40 ns. The CET-value of compositions having a-, b-, c- or d-values outside the claimed range does not become shorter than 60 ns, even at a thickness of 8 nm. For practical reasons, the thickness of the recording layer is at least 5 nm. Optimum results are achieved with a recording layer thickness between 7 and 14 nm.

It is noted that in European patent EP-B-569664 an optical information recording medium is disclosed having a recording layer with a recording material $(AgSbTe_2)_{0.43}$ 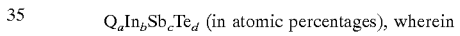 $(InSb_{0.77})_{0.57}$ which can be rewritten as $Ag_{15.7}In_{20.9}Sb_{31.9}Te_{31.5}$. The preferred layer thickness is between 20 and 300 nm. There is no indication of a CET-value or a user data bit rate in that patent specification.

Preferably, the recording material is a Ge—In—Sb—Te alloy (Q=Ge in the above formula), because this material shows a thermally more stable behaviour than Ag—In—Sb—Te material.

The cyclability of the medium can be represented by the value $M_{50000}/M_0$ when 50000 cycles are demanded, which is the relative change of optical contrast M after 50000 cycles and 0 cycles. M is defined as $(R_H-R_L)/R_H$, wherein $R_H$ and $R_L$ are the reflections of the crystalline and amorphous recording material. In every cycle the written amorphous marks are erased by recrystallizing through heating with a laser-light beam while the new amorphous marks are written. The ideal value of $M_{50000}/M_0$ is 1.0, i.e. the optical contrast remains unchanged after cycling.

There is no observable influence of the thickness of the first dielectric layer, i.e. the layer which is adjacent to the servotrack, and therefore in general between the substrate and the phase-change recording layer, on CET and the cyclability value $M_{50000}/M_0$. Thus, it is possible to vary the thickness of this layer for other, for example optical, reasons without affecting the thermal properties of the stack. This layer protects the recording layer against humidity and the substrate against thermal damage, and optimizes the optical contrast M.

From the viewpoint of jitter, the thickness of the first dielectric layer is preferably at least 70 nm. In view of e.g. optical contrast, the thickness of this layer is preferably limited to 500 nm.

An optimum thickness range for the second dielectric layer, i.e. the layer between the recording layer and the metal mirror layer, is found between 15 and 50 nm, preferably between 20 and 40 nm. When this layer is too thin, the thermal insulation between the recording layer and the metal mirror layer is adversely affected. As a result, the cooling rate of the recording layer is increased, which leads to a slow crystallization process and a poor cyclability. The cooling rate will be decreased by increasing the thickness of the second dielectric layer.

The CET-value is not sensitive to the thickness of the metal mirror layer in the range from 20 to 300 nm. But the cyclability is adversely affected when the metal mirror layer is thinner than 60 nm, because the cooling rate is too slow at such thicknesses. When the metal mirror layer is 200 nm or thicker, the cyclability deteriorates further, and the recording and erasing power must be high because of the increased thermal conduction. Preferably the thickness of the metal mirror layer is between 80 and 150 nm.

The first and second dielectric layers may be made of a mixture of ZnS and $SiO_2$, e.g. $(ZnS)_{80}(SiO_2)_{20}$. Alternatives are, e.g. $SiO_2$, $TiO_2$, ZnS, $Si_3N_4$, AlN and $Ta_2O_5$. Preferably, a carbide is used, like SiC, WC, TaC, ZrC or TiC. These materials give a higher crystallization speed and better cyclability than a $ZnS$—$SiO_2$ mixture.

For the metal mirror layer, metals such as Al, Ti, Au, Ni, Cu, Ag, Rh, Pt, Pd, Cr, Mn, Mo, W and Ta and alloys of these metals can be used. Examples of suitable alloys are AlTi, AlCr and AlTa.

Both the reflective layers and the dielectric layers can be provided by vapour deposition or sputtering.

The substrate of the information medium is at least transparent to the laser wavelength, and is made, for example, of polycarbonate, polymethyl methacrylate (PMMA), amorphous polyolefin or glass. In a typical example, the substrate is disc-shaped and has a diameter of 120 mm and a thickness of 0.1, 0.6 or 1.2 mm. When a substrate of 0.6 mm or 1.2 mm is used, the layers can be applied on this substrate starting with the first dielectric layer, recording layer, etc. The laser-light beam enters the stack via the entrance face of the substrate. The layers of the stack on the substrate may also be applied in the reversed order (inverse thin-film phase change stack), i.e. starting with the metal mirror layer, the second dielectric layer, phase change layer, etc. The last dielectric layer (which is now the first dielectric layer) is then provided with an optical quality transparent layer or sheet of one of the above materials with a thickness of 0.1 mm (100 µm). The laser-light beam enters the stack via the entrance face of this transparent layer.

Alternatively, the substrate may be in the form of a synthetic resin flexible tape, made e.g. from a polyester film. In this way an optical tape will be obtained for use in an optical tape recorder, which is for example based on a fast spinning polygon. In such a device the reflected laser-light beam makes transverse scans across the tape surface.

The surface of the disc-shaped substrate on the side of the recording layer is, preferably, provided with a servotrack which can be scanned optically. This servotrack is often constituted by a spiral-shaped groove and is formed in the substrate by means of a mould during injection moulding or pressing. This groove can be alternatively formed in a replication process in a synthetic resin layer, for example, a UV light-cured layer of acrylate, which is separately provided on the substrate. In high-density recording such a groove has a pitch e.g. of 0.7–0.8 µm and a width of 0.5 µm.

Optionally, the outermost layer of the stack is screened from the environment by means of a protective layer of, for example, UV light-cured poly(meth)acrylate. High-density recording and erasing can be achieved by using a short-wavelength laser, e.g. with a wavelength of 675 nm or shorter (red to blue).

The phase change recording layer can be applied to the substrate by vapour depositing or sputtering of a suitable target. The layer thus deposited is amorphous and exhibits a low reflection. In order to constitute a suitable recording layer having a high reflection, this layer must first be completely crystallized, which is commonly referred to as initialization. For this purpose, the recording layer can be heated in a furnace to a temperature above the crystallization temperature of the recording material, e.g. 180° C. If a synthetic resin substrate is used, such as polycarbonate, the recording layer can alternatively be heated by a laser-light beam of sufficient power. This can be realized, e.g. in a recorder, in which case the laser-light beam scans the moving recording layer. The amorphous layer is then locally heated to the crystallization temperature of the recording layer, without the substrate being subjected to a disadvantageous heat load.

If desired, an additional thin metal layer M' can be inserted between the substrate and the first dielectric layer, thereby forming a so called M'IPIM-structure. Although the structure becomes more complex, the additional metal layer increases the cooling rate of the recording layer as well as the optical contrast M.

Even shorter CET-values are obtained with an I I$^+$ P I$^+$ IM stack, wherein I, P and M have the meaning mentioned hereinabove, and wherein I$^+$ is a carbide layer. In this stack the recording layer P is sandwiched between two carbide layers I$^+$. The carbide of the first and second carbide layer is preferably a member of the group SiC, ZrC, TaC, TiC, and WC, which combine an excellent cyclability with a short CET. SiC is a preferred material because of its optical, mechanical and thermal properties; moreover, its price is relatively low.

The thickness of the first and the second carbide layer is preferably between 2 and 8 nm. The relatively high thermal conductivity of the carbide will only have a small effect on the stack when this thickness is small, thereby facilitating the thermal design of the stack.

Especially useful for high density land-groove recording is the addition of a light-absorptive layer A in the stack. The result of the addition of the light-absorptive layer A is that the difference in light-absorption between the amorphous state ($A_a$) and the crystalline state ($A_c$) is minimized, thus reducing the optical phase difference between these states. The difference between $A_c$ and $A_a$ should be close to zero, or preferably $A_c \geq A_a$.

The material of the light-absorptive layer A has an n/k ratio in the range between 0.5 and 20, preferably 0.6 and 16. These values give a proper balance between light absorption and transmission. Examples of materials which satisfy these conditions are metals selected from the group consisting of Mo, W, Pd, Pt, Co, Ni, Mn, Ta, Cr, Ti, and Hf, and semiconducting materials selected from the group consisting of PbS, Ge, InP, and Si. Preferred are Si and Ge, because they are cheap and easy to apply.

The thickness of the light-absorptive layer is preferably between 2 and 200 nm, more preferably between 10 and 100 nm, in order to have a proper balance between light absorption and transmission, and depends on the n/k ratio of the chosen material. For Si the thickness is about 75 nm, for Mo the thickness is about 35 nm, and for Ge the thickness is about 55 nm.

The addition of a light-absorptive layer A may result in the stack structures IPIAIM, I I$^+$ PI$^+$ AM, I I$^+$ PI$^+$ IAM or I I$^+$ PI$^+$ AIM, in which I, I$^+$, P and M have the meaning mentioned hereinabove. Preferred are the stacks in which a third dielectric layer is arranged between the light-absorptive layer and the second carbide layer. Such a third dielectric layer 13 can be used to optimize the thermal properties of the stack, and to avoid alloying between the second carbide layer and the light-absorptive layer. Such a stack has the structure: I I$^+$ PI$^+$ I$_3$ AIM.

BRIEF DESCRIPTION OF THE DRAWING

In the drawing

The invention will be elucidated in greater detail by means of exemplary embodiments and with reference to the accompanying drawings, in which.

DETAILED DESCRIPTION OF THE INVENTION

Exemplary Embodiment 1

Figure 1:
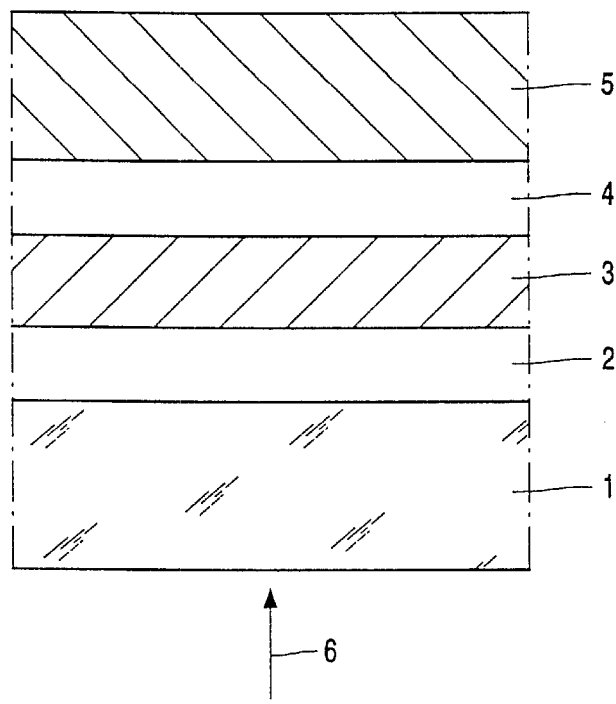
FIG. 1 shows a schematic cross-sectional view of an optical information medium in accordance with the invention.

FIG. 1 schematically shows a part of a cross-section of an optical information disc in accordance with the invention. Reference numeral 1 denotes a glass disc-shaped substrate having a diameter of 120 mm and a thickness of 1.2 mm. The substrate 1 is provided with an IPIM stack of the following structure:

dielectric layer 2 of $(ZnS)_{80}(SiO_2)_{20}$ with a thickness of 70 nm;

recording layer 3 of $Ag_{5.0}In_{5.5}Sb_{65.0}Te_{24.5}$ with a thickness d;

dielectric layer 4 of $(ZnS)_{80}(SiO_2)_{20}$ with a thickness of 25 nm;

metal mirror layer 5 of Al with a thickness of 100 nm.

All the layers are provided by sputtering. The initial crystalline state of the recording layer 3 is obtained by annealing the as-deposited amorphous alloy in a recorder wherein the recording layer is heated by a continuous laser-light beam above its crystallization temperature.

A laser-light beam for recording, reproducing and erasing of information enters the recording layer 3 via the substrate 1. This beam is schematically represented by arrow 6. The amorphous marks are written with single laser pulses of power $P_w = 1.25\ P_m$ ($P_m$=melting threshold power) and duration 100 ns. The erase power is $P_w/2$.

Figure 2:
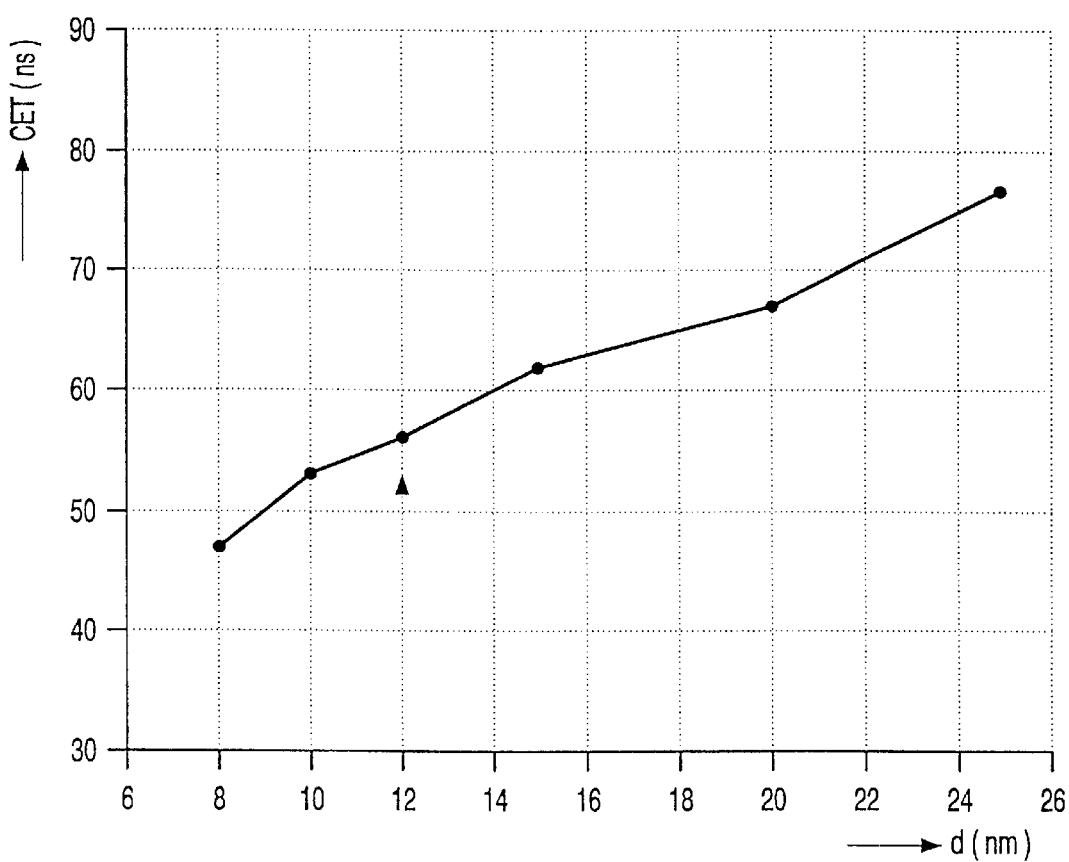
FIG. 2 is a graph showing the relation between CET (in ns) and the thickness d (in nm) of the recording layer with an Ag—In—Sb—Te recording material according to the invention.

The dependence of CET (in ns) (i.e. time when crystallization of a written amorphous mark is completed) on the thickness d (in nm) of the phase-change recording layer for the recording material is shown in FIG. 2. From this FIG. 2 it is clear that CET decreases with decreasing d. The CET-value becomes shorter than 60 ns when the recording layer is thinner than 15 nm.

In the same Figure the CET-value (indicated by means of ▼) is given of a recording layer having a thickness of 12 nm and comprising the same recording material in an I I$^+$ P I$^+$ I M structure, in which I$^+$ is a SiC layer having a thickness of 5 nm. In this stack the recording layer P is sandwiched between two carbide layers I$^+$. The other layer thicknesses and materials are the same as mentioned hereinabove. It is clear that the CET-value is even shorter than that in a IPIM stack as described above.

Exemplary Embodiment 2

Figure 3:
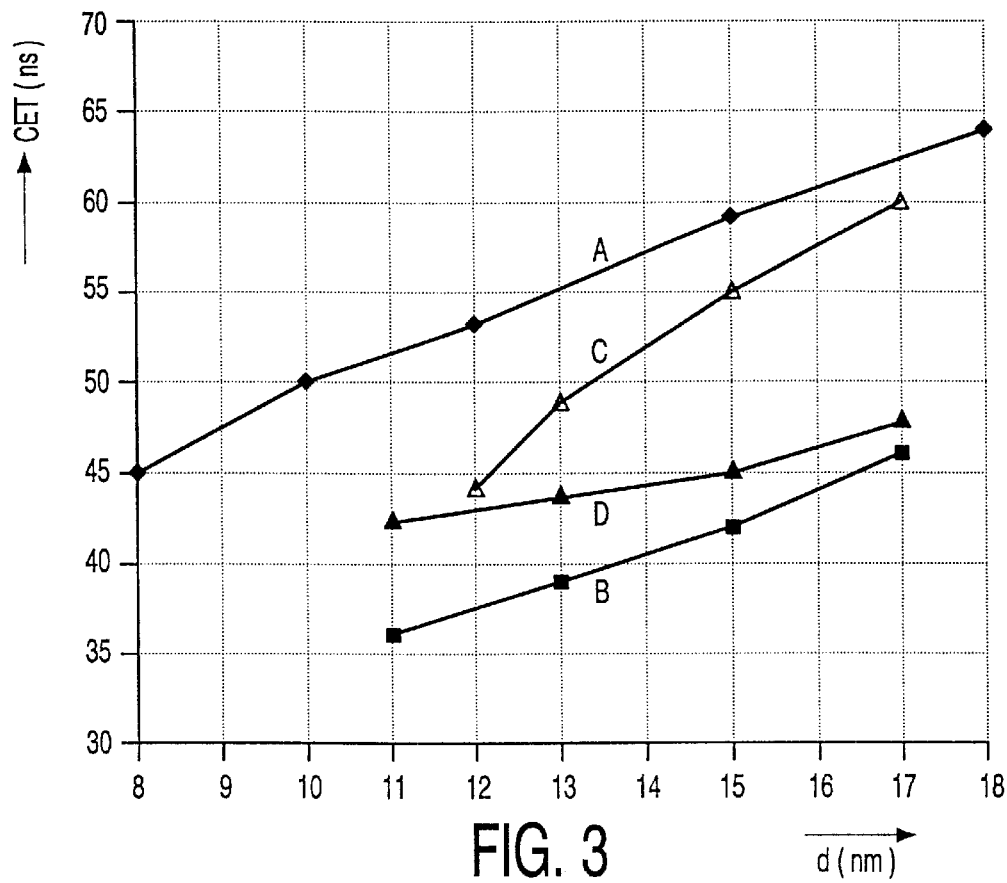
FIG. 3 is a graph showing the relation between CET (in ns) and the thickness d (in nm) of the recording layer with two different Ag—In—Sb—Te (curves A and B) and two different Ge—In—Sb—Te (curves C and D) recording materials according to the invention.

Exemplary embodiment 1 is repeated, using a recording layer 3 having the composition $Ag_{4.3}In^{4.3}Sb_{67.4}Te_{24.0}$. Curve A in FIG. 3 shows the dependence of CET on the thickness d of the recording layer. From this FIG. 3 it is clear that CET falls below 60 ns when the thickness d is 15 nm or lower.

Exemplary Embodiment 3

Exemplary embodiment 1 is repeated, using a recording layer 3 having the composition $Ag_{3.6}In_{3.1}Sb_{75.1}Te^{18.2}$. Curve B in FIG. 3 shows the dependence of CET on the thickness d of the recording layer. From this FIG. 3 it is clear that CET falls below 42 ns when the thickness d is 15 nm or lower.

Exemplary Embodiment 4

Exemplary embodiment 1 is repeated, using a recording layer 3 having the composition $Ge_{5.6}In_{2.2}Sb_{71.2}Te_{21.0}$. Curve C in FIG. 3 shows the dependence of CET on the thickness d of the recording layer. From this FIG. 3 it is clear that CET falls below 55 ns when the thickness d is 15 nm or lower.

A recording medium with a recording layer having a thickness of 12 nm (CET is 44 ns) is manufactured with this recording material. By using a blue laser diode with a wavelength of 405 nm, a recording density of 22 GB per 120 mm disk and a user data bit rate of 66 Mbit/s are obtained.

Exemplary Embodiment 5

Exemplary embodiment 1 is repeated, using a recording layer 3 having the composition $Ge_{5.1}In_{2.6}Sb_{73.2}Te_{19.1}$. Curve D in FIG. 3 shows the dependence of CET on the thickness d of the recording layer. From this FIG. 3 it is clear that CET falls below 45 ns when the thickness d is 15 nm or lower.

Comparative Example (not According to the Invention)

Figure 4:
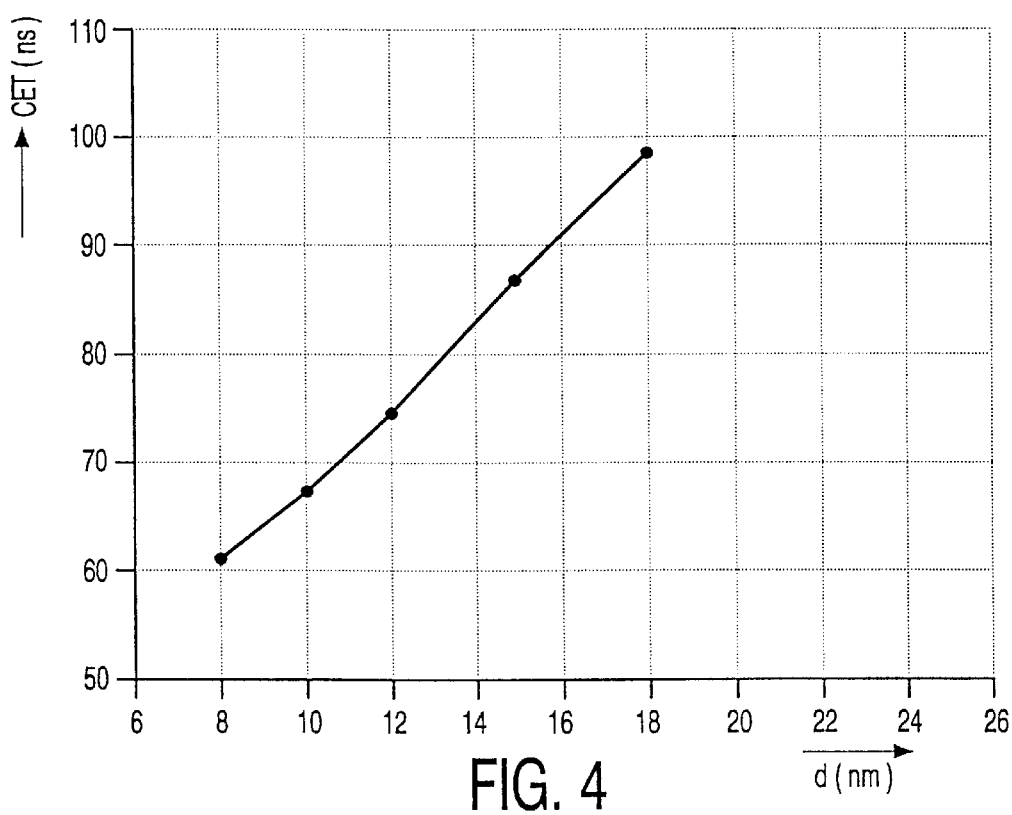
FIG. 4 is a graph showing the relation between CET (in ns) and the thickness d (in nm) of the recording layer with an Ag—In—Sb—Te recording material not according to the invention.

Exemplary embodiment 1 is repeated, using a recording layer 3 having the composition $Ag_{3.0}In_{12.0}Sb_{51.7}Te_{33.3}$. In this composition, the concentrations of In and Te are outside the claimed range. FIG. 4 shows the dependence of CET on the thickness d of the recording layer. From this FIG. 4 it is clear that the CET of this recording layer does not become shorter than 60 ns, even at a thickness of 8 nm.

According to the invention a rewritable optical information recording medium is provided, which is suitable for direct overwrite and high-speed recording, such as DVD+RW, DVR-red and DVR-blue.

What is claimed is:

1. An optical information recording medium for rewritable high-speed recording by means of a laser-light beam, said medium comprising a substrate carrying a stack of layers, which stack comprises, in this order, a first dielectric layer, a recording layer comprising a phase-change recording material comprising Sb and Te, a second dielectric layer and a metal mirror layer, characterized in that the recording material consists of a composition defined by the formula $Ge_a In_b Sb_c Te_d$ (in atomic percentages), wherein 2<a<8
0<b<6
55<c<80
15<d<30; a+b+c+d=100, and
the recording layer having a thickness of 5 to 15 nm.

2. An optical information medium as claimed in claim 1, characterized in that the recording layer has a thickness of 7 to 14 nm.

3. An optical information medium as claimed in claim 1, characterized in that the recording layer is sandwiched between two carbide layers, both having a thickness between 2 and 8 nm.

4. An optical information medium as claimed in claim 1, characterized in that the stack comprises a light-absorptive layer made from a material having an n/k ratio of 0.5 to 20, wherein n is the refractive index and k is the extinction coefficient, and wherein the light-absorptive layer has a thickness between 2 and 200 nm.

* * * * *